(12) United States Patent
Vincent

(10) Patent No.: US 12,016,743 B2
(45) Date of Patent: Jun. 25, 2024

(54) DEVICE FOR THE RELATIVE POSITIONING OF THE UPPER AND LOWER JAWS OF A SUBJECT

(71) Applicant: ONIRIS, Rueil-Malmaison (FR)

(72) Inventor: Thibault Vincent, Houilles (FR)

(73) Assignee: ONIRIS (FR)

( * ) Notice: Subject to any disclaimer, the term of this patent is extended or adjusted under 35 U.S.C. 154(b) by 237 days.

(21) Appl. No.: 17/283,603

(22) PCT Filed: Oct. 10, 2019

(86) PCT No.: PCT/FR2019/052413
§ 371 (c)(1),
(2) Date: Apr. 8, 2021

(87) PCT Pub. No.: WO2020/079353
PCT Pub. Date: Apr. 23, 2020

(65) Prior Publication Data
US 2021/0378788 A1    Dec. 9, 2021

(30) Foreign Application Priority Data
Oct. 15, 2018    (FR) .......................... 1871181

(51) Int. Cl.
*A61C 5/00*    (2017.01)
*A61C 7/36*    (2006.01)

(52) U.S. Cl.
CPC ................... *A61C 5/007* (2013.01)

(58) Field of Classification Search
CPC ....... A61C 5/007; A61C 7/08–10; A61C 7/36; A61F 5/566; A61F 5/56; A61F 2005/563;
(Continued)

(56) References Cited

U.S. PATENT DOCUMENTS 5,120,218 A * 6/1992 Hanson ................... A61C 7/36
433/19
5,324,196 A * 6/1994 Magill ..................... A61C 7/36
433/7
(Continued)

FOREIGN PATENT DOCUMENTS

CN    202761517    *  3/2013
DE    102008051221 A1 * 4/2010 ............. A61F 5/566
(Continued)

OTHER PUBLICATIONS

English Translation of Korean Patent Application Publication No. KR20130005255 (2013) (Year: 2013).*
(Continued)

*Primary Examiner* — Edward Moran
*Assistant Examiner* — Matthew P Saunders
(74) *Attorney, Agent, or Firm* — OSTROLENK FABER LLP

(57) ABSTRACT

A device for the relative positioning of the lower and upper jaws of a subject that includes splints intended to be disposed on the dental arches of the lower and upper jaws of the subject and linked by link members disposed in an occlusal position, between the splints, each link member includes posterior and anterior end parts made secure and articulated on a respective occlusal face of the upper and lower splints, so as to stress said lower splint in a forward direction. Each link member is composed of a rigid link rod of fixed length whose posterior end part is on the upper splint and in that the position of the posterior end part of each rigid link rod is longitudinally adjustable in the occlusal plane so as to adjust the position of the lower splint.

10 Claims, 2 Drawing Sheets

(58) Field of Classification Search
CPC ... A61F 5/58; A61M 16/049; A61M 16/0488; A61M 16/0493; A61B 5/4818; Y10S 602/902

See application file for complete search history.

(56) References Cited

U.S. PATENT DOCUMENTS

| | | | | |
|---|---|---|---|---|
| 5,409,017 | A * | 4/1995 | Lowe | A61C 7/10 128/859 |
| 5,829,441 | A * | 11/1998 | Kidd | A61F 5/566 128/859 |
| 10,251,729 | B1 * | 4/2019 | Raslambekov | A61C 7/36 |
| 2009/0090371 | A1 * | 4/2009 | Toussaint | A61F 5/566 602/5 |
| 2013/0220341 | A1 * | 8/2013 | Scheffel | A61C 19/04 29/428 |
| 2014/0224257 | A1 * | 8/2014 | Abramson | A61F 5/566 128/848 |
| 2017/0172785 | A1 | 6/2017 | Rogers | |
| 2018/0140385 | A1 | 5/2018 | Jasper | |
| 2019/0216632 | A1 * | 7/2019 | Fallon | A61F 5/566 |

FOREIGN PATENT DOCUMENTS

| | | | | |
|---|---|---|---|---|
| EP | 1516604 | A1 * | 3/2005 | ............. A61F 5/566 |
| EP | 1 658 823 | A1 | 5/2006 | |
| EP | 1516604 | B1 * | 5/2008 | ............. A61F 5/566 |
| FR | 2971141 | A1 * | 8/2012 | ............... A61C 7/08 |
| KR | 101184474 | B1 * | 9/2012 | |
| KR | 20130005255 | U * | 9/2013 | |

OTHER PUBLICATIONS

English Translation of Korean Patent Application Publication No. KR101184474 (2012) (Year: 2012).*
English Translation of European Patent Application Publication No. EU1516604 (2008) (Year: 2008).*
Translation of DE 102008051221 (Year: 2008).*
International Search Report dated Jan. 29, 2020 in corresponding PCT International Application No. PCT/FR2019/052413.
Written Opinion dated Jan. 29, 2020 in corresponding PCT International Application No. PCT/FR2019/052413.

* cited by examiner

DEVICE FOR THE RELATIVE POSITIONING OF THE UPPER AND LOWER JAWS OF A SUBJECT

CROSS-REFERENCE TO RELATED APPLICATIONS

The present application is a 35 U.S.C. §§ 371 national phase conversion of PCT/FR2019/052413, filed Oct. 10, 2019, which claims priority to French Patent Application No. 1871181, filed Oct. 15, 2018, the contents of which are incorporated herein by reference. The PCT International Application was published in the French language.

TECHNICAL FIELD

The subject of the invention is a device for the relative positioning of the lower and upper jaws of a subject, comprising splints intended to be disposed on the dental arches of the lower and upper jaws of the subject and linked by link members disposed in an occlusal position, between the splints, each link member comprising posterior and anterior end parts intended to be articulated on a respective occlusal face of the upper and lower splints, so as to stress said lower splint in a forward direction.

BACKGROUND OF THE INVENTION

Such a device is well known to the person skilled in the art, notably for example as given in the document EP 1 658 823. This document discloses a dental appliance of the type described above, in which the link members are composed of elastic and flexible thin blades mounted in an occlusal position between the splints and linked to the splints by articulations comprising pivots partially anchored in the splints, of an axis at right angles to the occlusal plane of the dental arches of the subject, of which the protruding parts are intended to be engaged in openings arranged at the respective ends of the thin blades and are secured by clips. More specifically, the blades each have an anterior opening mounted in a pivot secured to the upper splint in the vicinity of its front end and a posterior opening mounted in a pivot secured to the lower splint in the vicinity of its rear end.

Thus, the appliance, once put in place, provokes a permanent traction force on the lower jaw with respect to the upper jaw. In other words, the elastic and flexible thin blades work only by traction.

The traction-mode configuration has the major disadvantage of keeping the mouth of the user closed during the propulsion. That can result in a discomfort in some people and limits the possibilities of advancing of the jaw, and therefore the effectiveness of the treatment. In reality, according to the abovementioned document, only a limited possibility of opening of the mouth is possible, because of the possibility of flexural deformation of the thin blades positioned between the splints. However, while sleeping, many oral opening movements occur and in particular in the case of snoring and of sleep apnea. When the opening force is greater than the retention of the splints on the teeth, that provokes the disengagement of the splints and ineffectiveness of the treatment. It would therefore be desirable to have such an appliance that allows the fitting, on the occlusal face of the splints, of link members capable of working, not by traction, but by propulsion.

Furthermore, according to the abovementioned document, it is necessary to provide a set of several pairs of thin blades of different lengths, disposed in an occlusal position of the pair of splints, so as to allow a gradual adjustment of the appliance and to be able to follow, little-by-little, the difference in advance between the lower and upper jaws. In fact, the gradual advancing of the lower jaw is performed by acting on the length of the thin blades, by selecting thin blades of increasingly greater length. This procedure has the drawback of requiring multiple operations of fitting and removing of the thin blades for them to be replaced with another pair of thin blades of the set as the treatment advances, with the risks of breakage in the articulations of the thin blades or of loss of the clips holding the thin blades in place. It also increases the complexity of the management of the supply chain of this type of appliance, which has to be delivered in kit form comprising a set of pairs of thin blades of different lengths to allow the gradual adjustment of the appliance.

SUMMARY OF THE INVENTION

In this context, the aim of the present invention is to propose a device for the relative positioning of the lower and upper jaws of a subject, which does not have at least one of the limitations described above.

To this end, the device of the invention, otherwise conforming to the generic definition given thereof in the above preamble, is essentially characterized in that each link member is composed of a rigid link rod of fixed length whose posterior end part is on the upper splint and in that the position of the posterior end part of each rigid link rod is longitudinally adjustable in the occlusal plane so as to adjust the position of the lower splint.

Also, by virtue of this arrangement, the device is particularly well suited for a propulsive action of the link rods and there is no need for a set of link rods of different sizes to allow the advancing of the lower jaw to be adjusted. On the contrary, this adjustment can be performed according to the present invention with a single pair of link rods of fixed length, by simply setting the position of the posterior end part of the link rod from the upper splint, in a longitudinal direction in the occlusal plane. Longitudinally adjustable in the occlusal plane is understood here to mean that the position of the posterior end part of each link rod intended to be secured to the upper splint can be displaced in a posteroanterior direction (from back to front) and in an anteroposterior direction (from front to back).

Advantageously, said posterior end part comprises a head movably mounted in translation in a longitudinal guiding rail partially anchored on the occlusal face of the upper splint, to come into contact against a setting end stop housed inside said guiding rail, so that the position of said posterior end part in said guiding rail is adjustable according to the position of said setting end stop.

Advantageously, said guiding rail comprises a setting screw engaged in an axial threaded bore formed at a posterior end of said guiding rail, the anterior end of said setting screw constituting said setting end stop for said posterior end part of said link rod mounted in said guiding rail.

Preferably, said guiding rail extends over a length substantially vertically in line with the occlusal face of the molars.

Advantageously, the lower splint comprises a recess formed in said occlusal face of said lower splint, of a form complementing that of said guiding rail and intended to receive a protruding part of said guiding rail.

Preferably, said head of said posterior end part of said link rod is in the form of a ball joint.

Advantageously, said anterior end part of the link rods comprises a removable articulated fixing member on an attachment device disposed on the occlusal face of the lower splint.

Preferably, said attachment device is mounted in a hollow housing formed in the body of the lower splint without protruding from said occlusal face.

Preferably, said removable articulated fixing member comprises a female element and said attachment device constitutes a pivoting male element.

Advantageously, said pivoting male element comprises a pivoting axis arranged transversely in said hollow housing and said female element has a circular profile that is open over a section allowing an elastic snap-fitting of said circular profile on said transverse pivoting axis, the open section of the female element being positioned in the axis of the link rod.

BRIEF DESCRIPTION OF THE DRAWINGS

The invention is now described with reference to the attached, non-limiting drawings, in which.

DESCRIPTION OF PREFERRED EMBODIMENTS

Figure 1:
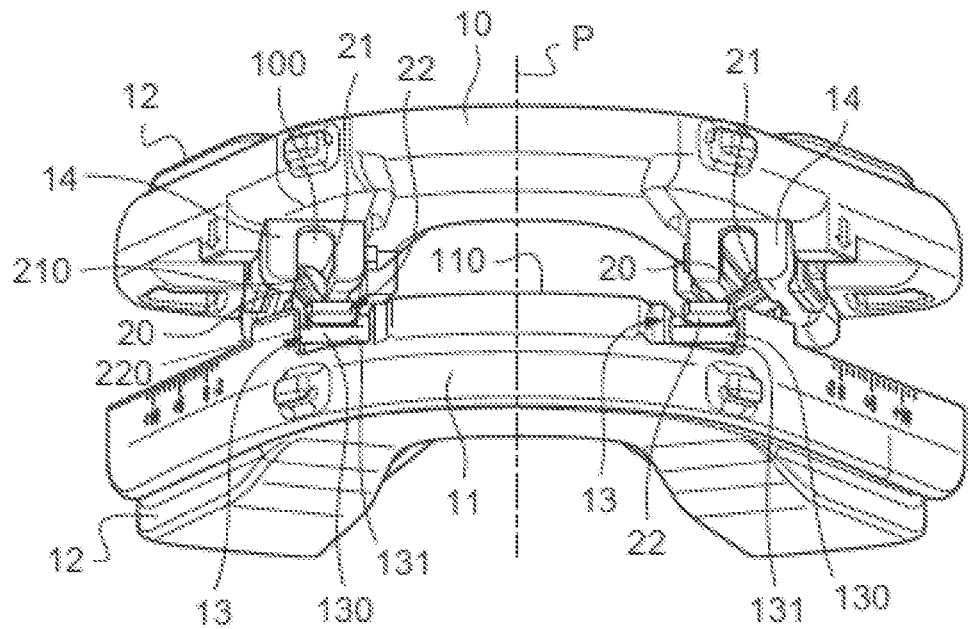
FIG. 1 represents a front perspective view of the device according to the invention.
Figure 2:
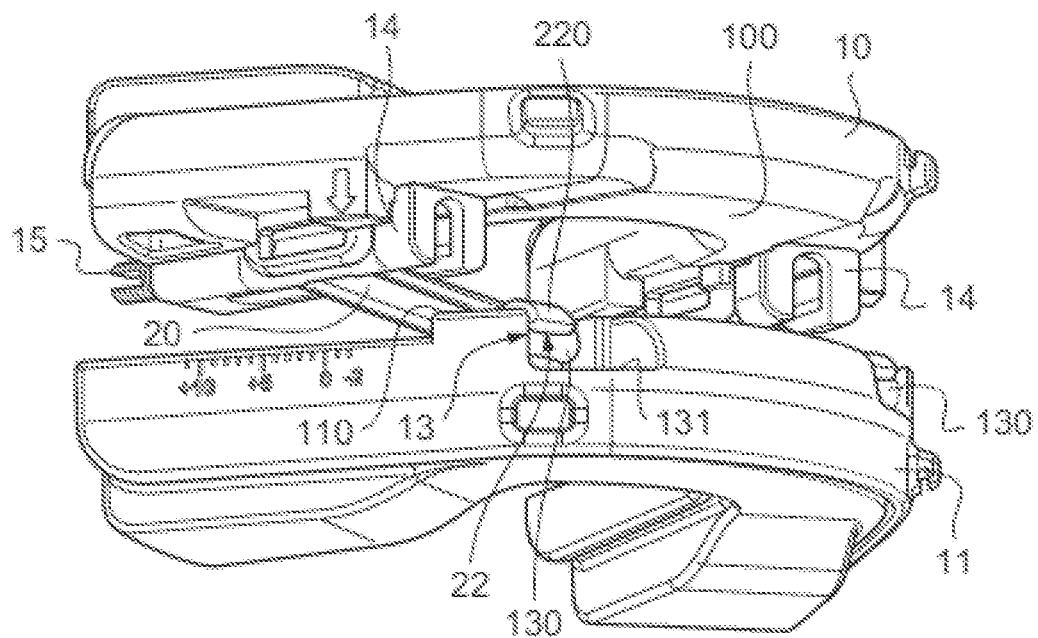
FIG. 2 represents a side perspective view of the device according to the invention.
Figure 3:
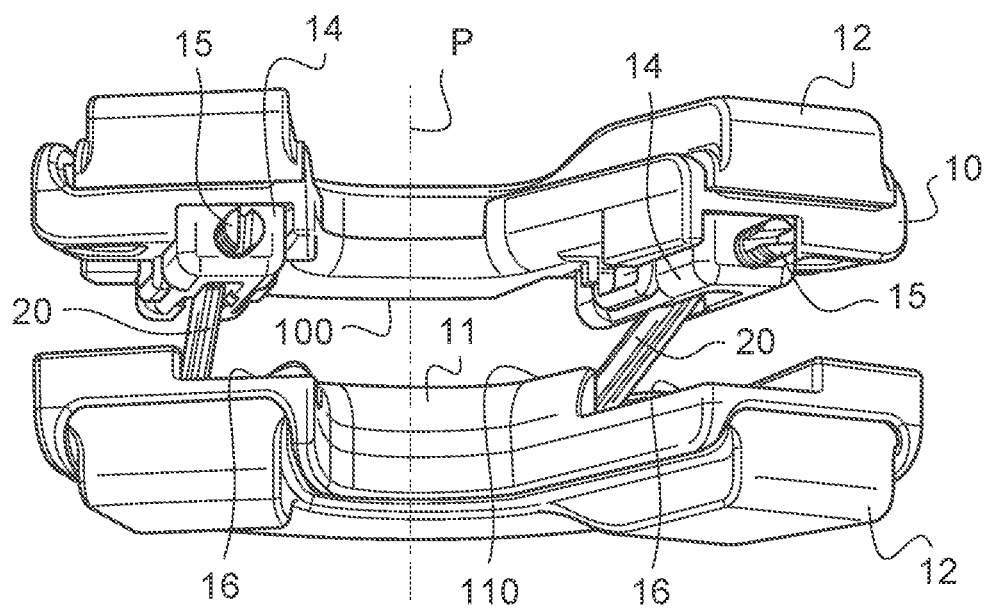
FIG. 3 represents a perspective view from the rear of the device according to the invention.

The device 1 comprises two splints, respectively upper and lower, represented schematically in FIGS. 1 to 3. The splint 10 of the dental arch of the upper (or maxillary) jaw, called upper splint, is situated above the splint 11 of the dental arch of the lower (or mandibular) jaw, called lower splint. The two upper and lower splints 10 and 11 are substantially in the form of a U-shaped hollow channel and are symmetrical with respect to the median sagittal plane P of the subject. The plane of extension and of contact of the splints, defined between the upper 10 and lower 11 splints, is defined as being the occlusal plane, i.e. a transverse plane orthogonal to the plane P. The lower splint 11 is represented here in advanced position with respect to the upper splint 10. The splints are produced by molding a thermoplastic material.

The two splints 10 and 11 are intended to accommodate, in their channel, a thermoformable material 12 taking the imprint of teeth, for example of EVA (ethylene vinyl acetate).

In this advanced position of the lower splint 11, the two upper and lower splints 10 and 11 are linked by two link rods 20, mounted in occlusal position, between the splints 10 and 11, each link rod 20 comprising posterior 21 and anterior 22 end parts, made secure and articulated on an occlusal face 100, 110 respectively of the upper splint 10 and of the lower splint 11. The occlusal face of the splints is the face of these splints which is oriented facing the occlusal plane. Each link rod 20 thus extends in a space delimited by the occlusal faces of the upper 10 and lower 11 splints.

The posterior end part 21 of each link rod 20 is fixed articulated in the posterior part of the upper splint 10 and the anterior end part 22 of each link rod 20 is fixed articulated in the anterior part of the lower splint 11, the fitting of the link rods then being done by propulsion.

The link rods 20 are preferentially made of a molded rigid or semi-rigid plastic material.

The occlusal face 110 of the lower splint 11 is provided with an attachment device 13, arranged in the anterior part of the lower splint 11, on either side of the median sagittal plane P, to which the anterior end part 22 of each link rod 20 is removably fixed articulated.

According to the embodiment illustrated in the figures, each anterior attachment device 13 comprises a pivot in the form of a male cylindrical axis 130 arranged transversely, i.e. at right angles to the median plane P, in a hollow housing 131 formed in the anterior part in the body of the lower splint 11. Preferentially, the pivoting axis 130 is arranged between two opposing walls of the hollow housing 131 substantially flush with a top surface of the occlusal face 110 of the lower splint 11. The attachment device 13 of the anterior end part 22 of each link rod 20 is thus fitted in the hollow housing 131 of said occlusal face, without protruding, so as to minimize the oral opening by propulsion.

According to this embodiment, the anterior end part 22 of each link rod 20 comprises a female element, intended to cooperate with the pivoting axis 130 of the anterior attachment device 13 of the lower splint 11. This female element of open ring type 220 has a circular profile that is open over a section dimensioned so as to allow elastic snap-fitting of the anterior end part 22 of the link rod on the transverse pivoting axis 130. The open section of the female element in the form of an open ring 220 is positioned in the axis of the link rod 20, so that, upon the propulsive action of the link rod, the closed part of the open ring effectively opposes the forces of retraction of the lower jaw.

The anterior end part 22 of the link rod 20 could comprise other types of male or female profiles, intended to be elastically engaged in a complementary profile formed on the attachment device 13, to produce the elastic snap-fitting of the anterior end part of the link rod in the anterior part of the lower splint. Thus, such a profile could, alternatively, comprise a ball joint elastically engaging in a counter-ball joint formed on the attachment device 13.

According to the embodiment illustrated in the figures, the open ring 220 can have an axial dimension (which extends transversely to the median plane P) slightly smaller than the length of the pivoting axis 130 extending in the hollow housing 131, so as to allow a certain lateral range of travel of the lower jaw. By adjusting the play between these elements ensuring the link between the link rod 20 and the splint in the anterior part thereof, it is possible to set the lateral range of travel allowed for the link rod. It is possible to choose to have a certain lateral play, but it is also possible to choose to eliminate this play by a tight adjustment of the open ring between the two opposing walls of the hollow housing 131 between which the pivoting axis 130 extends transversely, so that only a pivoting movement about the pivoting axis is allowed, without lateral range of travel.

The upper splint 10 is provided, in its posterior part, with two longitudinal guiding rails 14 which are partially anchored on the occlusal face 100 of the upper splint 10 and which are disposed symmetrically on either side of the median plane P.

Each guiding rail 14 extends preferentially over a length substantially vertically in line with the occlusal face of the molars of the subject, when the upper splint 10 is worn. Each guiding rail 14 is incorporated in or fixed to the upper splint 10.

Provision is made for the lower splint 11 to include a recess 16, formed in its occlusal face, of a form complementing that of the guiding rail 14 fixed on the occlusal face of the upper splint 10. This recess allows the protruding part of the guiding rail 14 to be received, so as to minimize the oral opening by propulsion. The forward extension of this recess can constitute the hollow housing 131 in which the anterior attachment device 13 of the lower splint is arranged.

Each guiding rail 14 comprises a longitudinal groove suitable for allowing a head 210 of the posterior end part 21 of a link rod 20, preferentially in the form of a ball joint, to be received so that this posterior end part 21 is linked thereto with a degree of freedom in translation in the posteroanterior and anteroposterior directions, that a movable setting end stop limits on the posterior side of the guiding travel defined by the guiding rail 14. The return force exerted by the lower jaw compresses the link rod and keeps the latter engaged in the groove of the guiding rail against the movable setting end stop disposed in the rail.

The head of the posterior end part 21 is therefore movably mounted in translation in the guiding rail 14, to come into contact against the movable setting end stop housed inside the guiding rail, such that the position of the posterior end part 21 of the link rod in the guiding rail 14 is adjustable according to the position of the setting end stop.

This end stop consists of a setting screw 15 engaged in an axial threaded bore formed at a posterior end of the guiding rail 14. More specifically, the anterior axial end (not visible in the figures) of this setting screw 15, disposed inside the guiding rail 14, has a radial contact surface which constitutes the setting end stop for the posterior end part 21 of the link rod fitted in the guiding rail 14. The posterior axial end of the setting screw 15, for its part, emerges behind the posterior end of the guiding rail 14 and is designed to cooperate with a tool allowing the setting screw 15 to be driven in rotation for it to be screwed or unscrewed in the guiding rail. Thus, by screwing or unscrewing this setting screw 15, the position of its anterior end forming an abutment for the posterior end part 21 of the link rod can respectively be advanced or retracted in the guiding rail 14. Consequently, the position of the posterior end part 21 of the link rod which is compressed against the end stop under the effect of the return force exerted by the lower jaw, can be adjusted using the setting screw 15. Thus, in the context of a treatment for sleep apnea or snoring problems, the device of the invention makes it possible to subject the lower jaw of the subject to an incremental advancing movement by screwing, little-by-little, the setting screw 15 so as to shift the position of the posterior end part 21 of the link rod forward in each phase of execution of the treatment, until the end of the problems is observed. By virtue of the possibility of modifying the position of the posterior end part 21 of the link rod, this setting can be performed with just one and the same set of link rods of fixed length.

The device of the invention can advantageously be associated with a set of setting screws 15 comprising a plurality, in particular at least two, setting screws of different lengths. In fact, when the shifting of the lower jaw forward of the upper jaw has to be small or not very pronounced, it is necessary to set the position of the posterior end part of the link rods more backward of the guiding rail, whereas, conversely, when this shifting of the lower jaw forward of the upper jaw has to be significant, it is necessary to set the position of the posterior end part of the link rods forward of the guiding rail. The use of a single screw length suitable for setting these different positions means, in the first particular case described, that a substantial part of the setting screw emerges axially outside the guiding rail with the risk of constituting a nuisance for the subject. So, to mitigate this, at least one first setting screw of a first length is preferentially provided, designed to set the position of the end stop more in the rear part of the guiding rail with a portion emerging from the rail that is relatively small and a second setting screw of a second, greater length is provided, suitable for setting the position of the end stop more in the front part of the guiding rail, still with a portion emerging from the rail that is relatively small, and which is therefore suitable for more significant forward shifts of the lower jaw. In other words, a first setting screw is provided whose length is suited to the adjustment of the small forward shifts of the lower jaw and a second setting screw is provided whose length is suited to the adjustments of more significant forward shifts of the lower jaw.

Furthermore, it will be noted that this screw setting system makes it possible to obtain a high accuracy of the adjustment of the degree of advance of the lower jaw, which is dependent on the threading of the setting screw. The accuracy and precision of the setting obtained with this system is much greater than the conventional setting system of the prior art, which relies on changing the size of the link rods used, generally allowing for an adjustment by 1 mm increments.

As an example, according to the present invention, with one and the same set of link rods of fixed size and two different setting screw lengths, it is possible to cover approximately 12 mm of adjustment amplitude. To obtain the same result with link rods whose size varies by 1 mm increments, it would be necessary to have 12 sets of link rods of different sizes and even more if a greater setting accuracy, i.e. with a smaller adjustment pitch, were required.

The invention claimed is:

1. A device for the relative positioning of the lower and upper jaws of a subject, comprising lower and upper splints intended to be disposed on the dental arches of the lower and upper jaws of the subject and linked by link members disposed in an occlusal position, between the splints, each link member comprising posterior and anterior end parts, the posterior end part being longitudinally movable relative to an occlusal face of the upper splint, and the anterior end part being connected to the lower splint and longitudinally immovable over an occlusal face of the lower splint when connected to the lower splint, so as to stress said lower splint in a forward direction relative to the upper splint when the posterior end part is moved longitudinally relative to the occlusal face of the upper splint, wherein each link member is composed of a rigid link rod of fixed length whose posterior end part is on the upper splint and in that the position of the posterior end part of each rigid link rod is longitudinally adjustable in the occlusal plane so as to adjust the position of the lower splint, wherein said posterior end part comprises a head movably mounted in translation in a longitudinal guiding rail on the occlusal face of the upper splint, and wherein the lower splint comprises a recess that receives a protruding part of said guiding rail, and wherein said recess is formed in said occlusal face of said lower splint, and is of a form complementing that of said guiding rail.

2. The device as claimed in claim 1, wherein said longitudinal guiding rail is partially anchored on the occlusal face of the upper splint, and wherein the head comes into contact against a setting end stop housed inside said guiding rail, so that the position of said posterior end part in said guiding rail is adjustable according to the position of said setting end stop.

3. The device as claimed in claim 2, wherein said guiding rail comprises a setting screw engaged in an axial threaded bore formed at a posterior end of said guiding rail, the anterior end of said setting screw constituting said setting end stop for said posterior end part of said link rod mounted in said guiding rail.

4. The device as claimed in claim 1, further comprising a set of setting screws comprising at least two setting screws of different lengths.

5. The device as claimed in claim 2, wherein said guiding rail extends over a length vertically in line with the occlusal face of molars.

6. The device as claimed in claim 2, wherein said head of said posterior end part of said link rod is in the form of a ball joint.

7. The device as claimed in claim 1, wherein said anterior end part of the link rods comprises a removable articulated fixing member on an attachment device disposed on the occlusal face of the lower splint.

8. The device as claimed in claim 7, wherein said attachment device is mounted in a hollow housing formed in the body of the lower splint without protruding from said occlusal face.

9. The device as claimed in claim 7, wherein said removable articulated fixing member comprises a female element and said attachment device constitutes a pivoting male element.

10. The device as claimed in claim 9, wherein said pivoting male element comprises a pivoting axis arranged transversely in said hollow housing and said female element has a circular profile that is open over a section allowing an elastic snap-fitting of said circular profile on said transverse pivoting axis, the open section of the female element being positioned in the axis of the link rod.

* * * * *